(12) United States Patent
Mattison et al.

(10) Patent No.: US 12,248,923 B2
(45) Date of Patent: Mar. 11, 2025

(54) DEVICE FOR RESOURCE DISPENSING USING ALTERNATIVE COMMUNICATION RAILS

(71) Applicant: BANK OF AMERICA CORPORATION, Charlotte, NC (US)

(72) Inventors: Paul Martin Mattison, Sherrills Ford, NC (US); Matthew Edward Williams, Frisco, TX (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 87 days.

(21) Appl. No.: 17/978,529

(22) Filed: Nov. 1, 2022

(65) Prior Publication Data

US 2024/0144227 A1 May 2, 2024

(51) Int. Cl.
| | |
|---|---|
| G06Q 20/10 | (2012.01) |
| G06Q 20/20 | (2012.01) |
| G06Q 20/26 | (2012.01) |
| G06Q 20/32 | (2012.01) |
| G06Q 20/42 | (2012.01) |

(52) U.S. Cl.
CPC ................... G06Q 20/26 (2013.01)

(58) Field of Classification Search
CPC ....................................... G06Q 20/26
USPC ......................................... 705/39
See application file for complete search history.

(56) References Cited

U.S. PATENT DOCUMENTS

| | | | |
|---|---|---|---|
| 9,010,629 | B2 | 4/2015 | Smith et al. |
| 10,262,334 | B2 | 4/2019 | Heeter |
| 11,017,381 | B1 | 5/2021 | Winklevoss et al. |
| 11,100,490 | B1 | 8/2021 | Doyle et al. |
| 11,132,652 | B2 | 9/2021 | Doyle et al. |
| 11,301,576 | B2 | 4/2022 | Heeter |
| 2015/0186871 | A1 | 7/2015 | Laracey |
| 2021/0133710 | A1 | 5/2021 | Kohli et al. |
| 2021/0326836 | A1 | 10/2021 | Hanson et al. |
| 2021/0326844 | A1 | 10/2021 | Zhou et al. |
| 2022/0067719 | A1 | 3/2022 | Digangi et al. |
| 2022/0147956 | A1 | 5/2022 | Kerolos |
| 2022/0198528 | A1 | 6/2022 | Tietzen et al. |

(Continued)

*Primary Examiner* — Clifford B Madamba
(74) *Attorney, Agent, or Firm* — Moore & Van Allen PLLC; Nicholas C. Russell

(57) ABSTRACT

Systems, computer program products, and methods are described herein for activity data transmission in real-time using alternative communication rails to skip processing touch points. Specifically, the systems, apparatuses, methods and computer program products of the present invention are directed to a secure platform for preemptive transformation and structuring of resource data at a resource instrument device and authentication of resource data for processing from the resource instrument device to an end point party in real time without requiring intermediary processing. In some embodiments the apparatuses and systems comprise a resource processing terminal device structured for operative communication with a resource instrument device with a mobile application embedded thereon via a first proximity communication channel between the resource processing terminal and the resource instrument device using request for resource distribution messaging associated with alternative rail resource distribution processing.

20 Claims, 4 Drawing Sheets

(56) References Cited

U.S. PATENT DOCUMENTS

| | | |
|---|---|---|
| 2022/0253840 A1 | 8/2022 | Kolchin |
| 2022/0309461 A1* | 9/2022 | Wang et al. |
| 2023/0056764 A1* | 2/2023 | Jones .................... G06Q 40/03 |
| 2023/0214811 A1* | 7/2023 | White .................... G06Q 20/42 |
| | | 705/18 |

\* cited by examiner

DEVICE FOR RESOURCE DISPENSING USING ALTERNATIVE COMMUNICATION RAILS

BACKGROUND

Transmissions of activity data associated from networked devices is increasingly widespread. Some conventional systems employ instrument devices with integrated circuit chips that can be read using near field communication or radio frequency communication, for the purposes of easily and quickly transmitting data for initiating activities. With advancements in technology real time activity data transmission is now available. Maintaining security of activity data from networked devices, determining authorization of the users and/or the entities involved in the activities, and managing expedited end point transmission are an important concern. However, determining validity of activities and processing end party recipient thereof is time intensive and consumes immense processing resources. Accordingly, the activity data may be transmitted across multiple party systems prior to end point processing. Moreover, conventional rapid interaction completion systems inherently not structured for real time processing to the end point. Therefore, there is a need for systems, methods and computer program products for activity data dispensing using alternative communication rails for end point transmission in real time.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Some embodiments of the invention are directed to systems, apparatuses, methods and computer program products for activity data dispensing or resource dispensing to specific end users using alternative communication rails in real time. Specifically, the systems, apparatuses, methods and computer program products of the present invention are directed to a secure platform for preemptive transformation and structuring of resource data at a resource instrument device, and authentication of resource data for processing from the resource instrument device to an end point party in real time without requiring intermediary processing. In some embodiments the apparatuses and systems comprise a resource processing terminal device structured for operative communication with a resource instrument device such as a mobile device with a mobile application embedded thereon via a first proximity communication channel between the resource processing terminal and the resource instrument device.

Typically, the resource instrument device and the resource processing terminal comprise one or more proximity scanner device structured for detecting at least one parameter associated with the activity data that is populated from an invoice via the first proximity communication channel. In some embodiments the apparatuses and systems further comprise at least one memory device, at least one communication device connected to a distributed network and at least one processing device operatively coupled to the at least one memory device. The apparatuses and systems further comprise a module stored in the at least one memory device comprising executable instructions that when executed by the at least one processing device, cause the at least one processing device to perform the steps provided herein.

Shortly, real time payments will be launched as a service with the capabilities of this service including a Request for Pay (RFP) which will allow both businesses and consumers request a payment from someone. In some embodiments, the system uses the RFP messaging of real time resource distribution to send request for payments and activity data to end parties by enabling a mechanism at a resource processing terminal, such as an automated teller machine (ATM).

A user can scan an indicia, such as a QR code on the screen of a resource processing terminal using a resource instrument device with a mobile application. The linkage displaying the RFP allows the user to submit activity data, such as cash to complete the invoice via real time processing to an end party. In addition, entities that typically collect resources, such as distributors, will be able to use the system and RFP messaging for invoicing provided by the distributor to deposit activity data into the appropriate accounts as they move through their distribution routes so that they do not have resources on hand for extended periods of time.

In addition, a user who is requesting resources and not transmitting resources could obtain resources in cash at the resource processing terminal. The user receiving resources can scan the indicia code on the resource processing terminal display and physical resources will be dispensed using the resource processing terminal.

Embodiments of the present invention address these and/or other needs by providing an innovative system, method and computer program product for physical resource dispensing using alternative communication rails, the invention comprising: receiving resource distribution request input into request for payment (RFP) message on alternative communication rail from an end point entity to a user; triggering the alternative communication rail processing based on input into the RFP message from an end point entity; creating a readable indicia for presentation at a resource processing terminal associated with an entity system network; presenting the readable indicia at a resource processing terminal device upon user authentication into the resource processing terminal device; generating a resource instrument device based on user scanning of the readable indicia at the resource processing terminal device using a user device; creating an operative communication linkage between the resource instrument device with a mobile application embedded thereon and the resource processing terminal device via a first proximity communication channel using the RFP message associated with alternative rail resource distribution processing; and allowing direct physical resource distribution between the end point entity and the user via the resource processing terminal device using the alternative communication rail.

In some embodiments, the resource distribution request input into the RFP message further comprises an invoice from an end point entity that includes a request for distribution to the end point entity or a request for distribution to the user of physical resources.

In some embodiments, the invention further comprises eliminating multiparty processing of the resource distribution using the RFP message on the alternative communication rail, wherein the alternative communication rail is a real-time payment rail.

In some embodiments, the user has an account and a mobile application associated with the entity system network, wherein the entity system network is a financial institution network.

In some embodiments, the invention further comprises tracking resource processing by communicating with a location of the RFP message across a single rail.

In some embodiments, the resource instrument device further comprises the user device with a mobile application associated with the entity system network after scanning of the readable indicia.

In some embodiments, presenting the readable indicia at a resource processing terminal device upon user authentication into the resource processing terminal device further comprises initial authentication of the user into the resource processing terminal device via PIN and card authentication.

In some embodiments, allowing direct physical resource distribution between the end point entity and the user further comprises distribution of physical cash from the user to the end point entity or from the end point entity to the user using RFP messaging over a real-time payment rail without multiparty processing.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
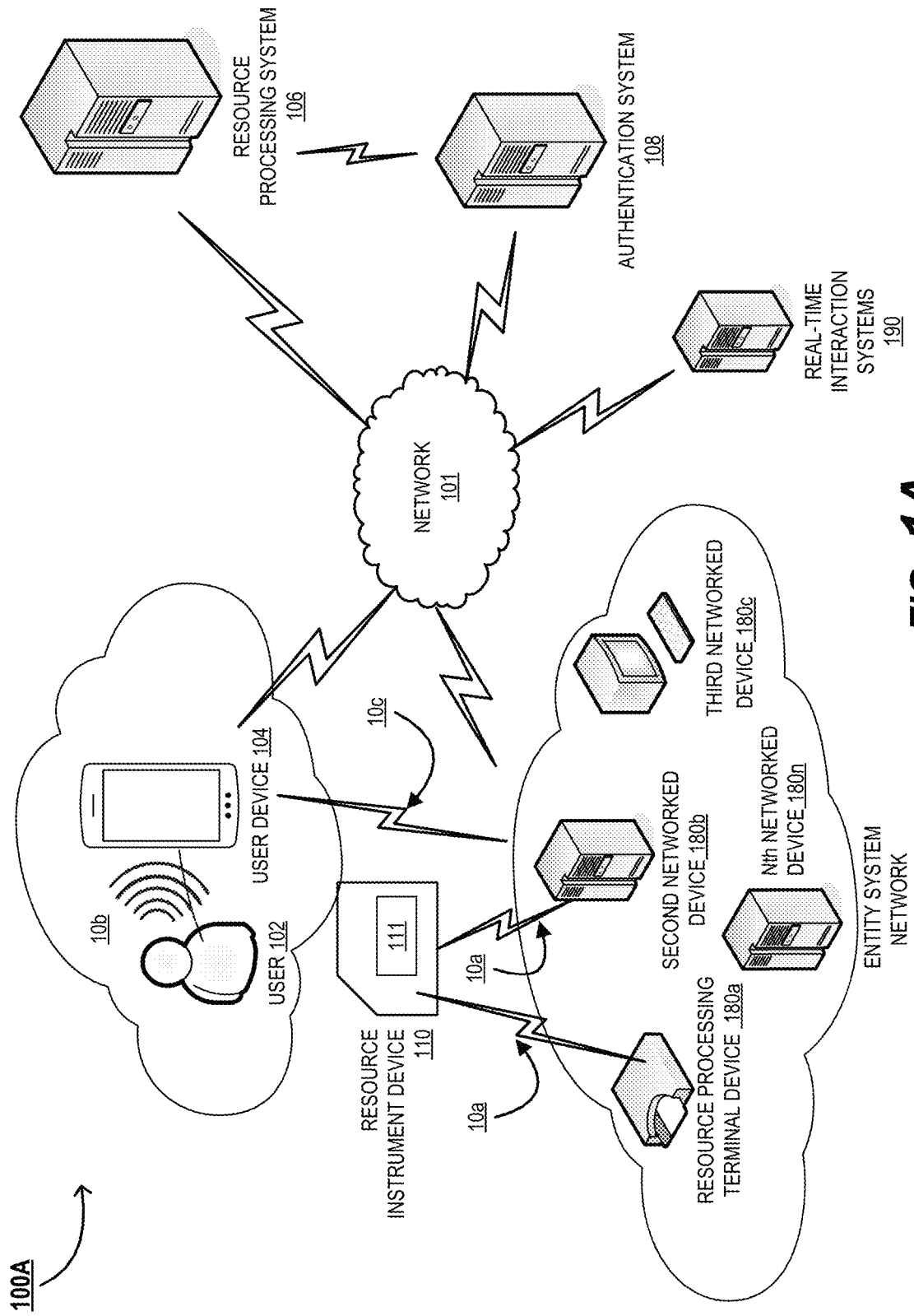
Figure 1B:
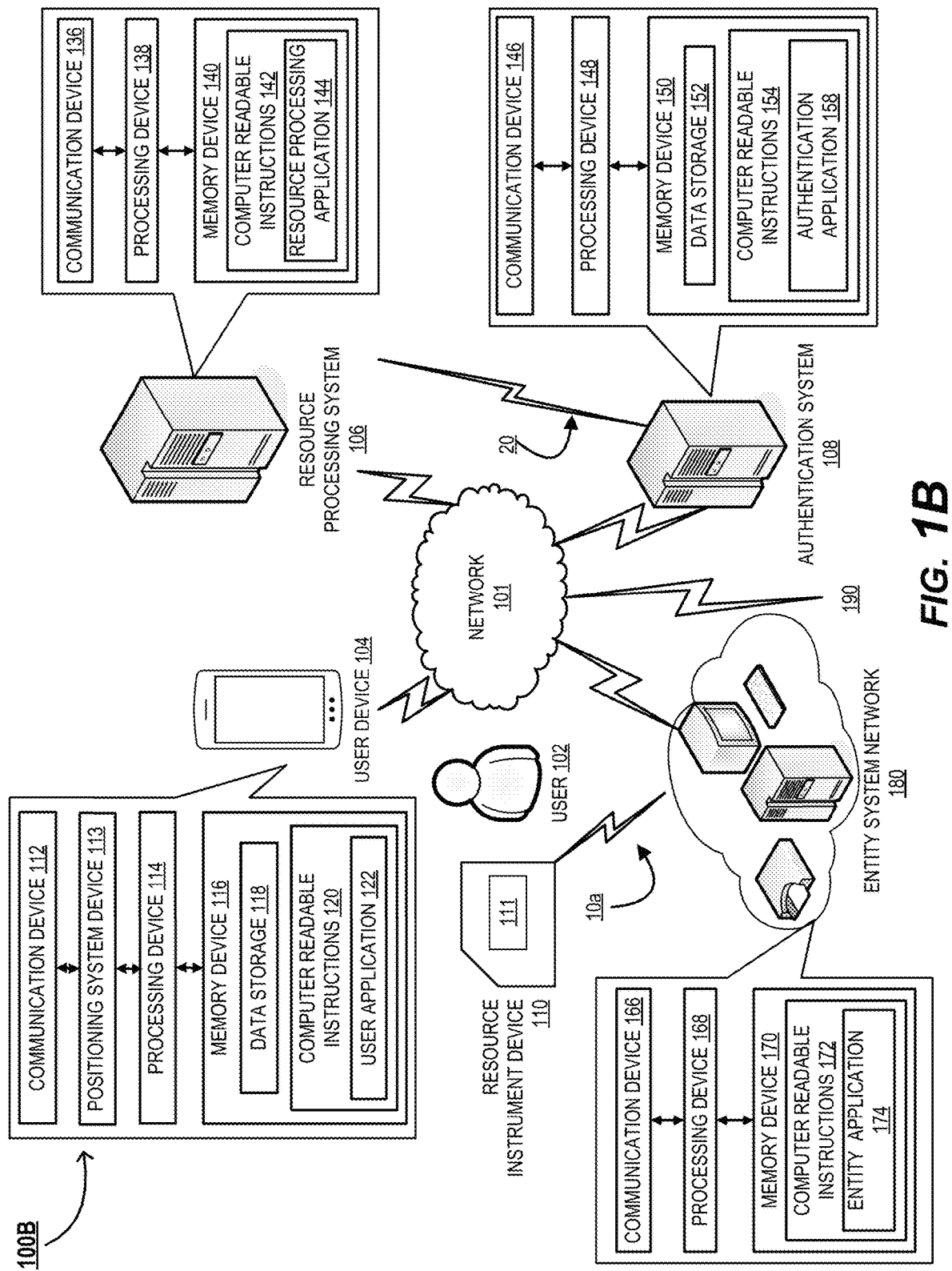
Figure 2:
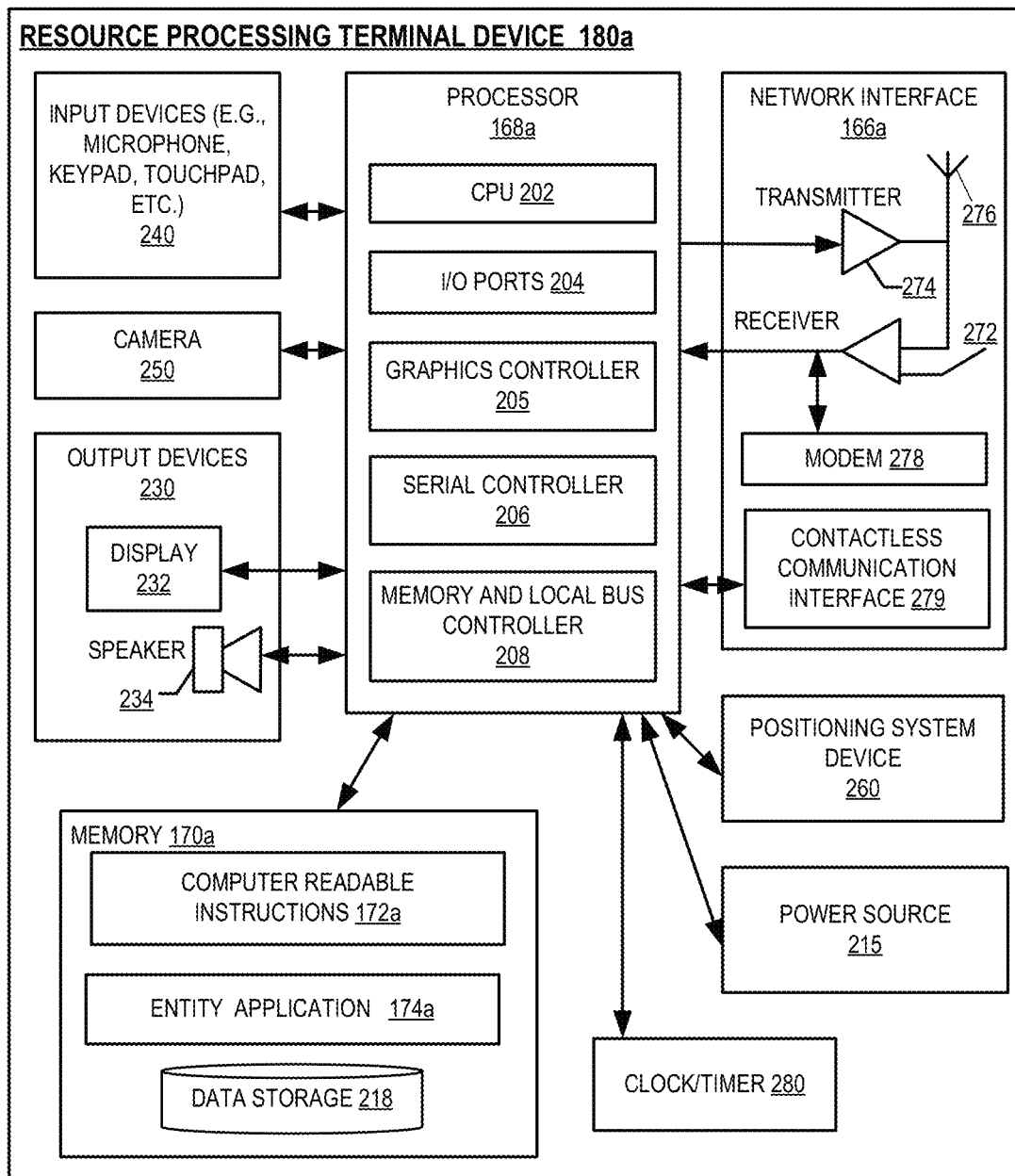
Figure 3:
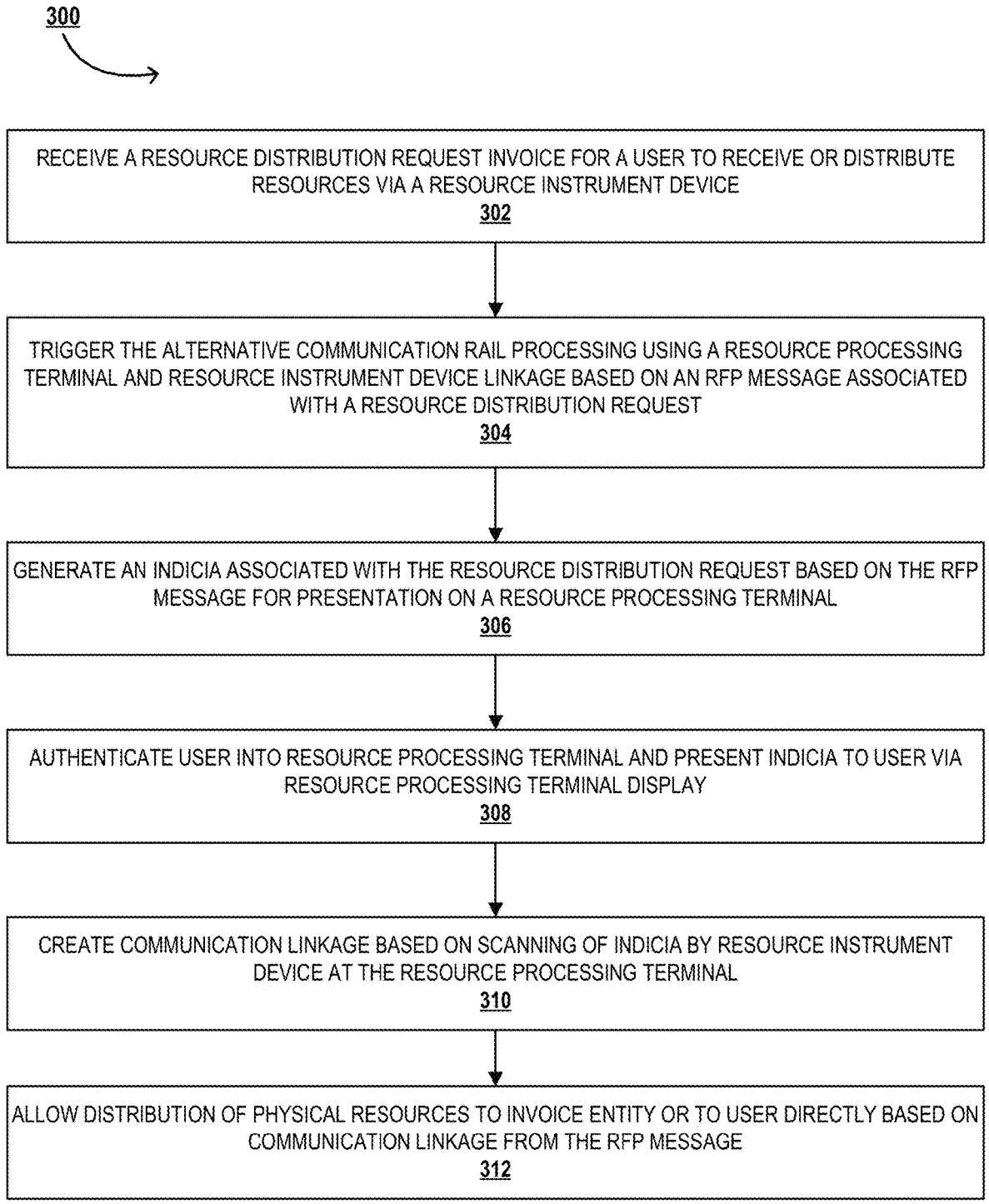

Having thus described embodiments of the invention in general terms, reference will now be made to the accompanying drawings, where:

FIG. 1A illustrates a schematic representation 100A of a physical resource dispensing using alternative communication rails system and environment, in accordance with embodiments of the present invention;

FIG. 1B illustrates a schematic representation 100B of the physical resource dispensing using alternative communication rails system and environment of FIG. 1A, in accordance with embodiments of the present invention;

FIG. 2 illustrates a schematic representation 200 of a resource processing terminal device, in accordance with embodiments of the present invention; and FIG. 3 illustrates a high-level process flow 300 for physical resource dispensing using alternative communication rails, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution, such as a distributer or end point party providing invoices for products or services provided. such, the entity may be any institution, group, association, financial institution, governmental agency, federal financial establishment, company, union, authority or the like.

As described herein, a "user" may be an individual or individual associated with an entity. As such, in some embodiments, the user may be an individual having past relationships, current relationships or potential future relationships with an entity. In some embodiments, the user may have an outstanding invoice with an entity, be a product purchaser, or be a resource recipient.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, a "resource processing terminal" may be part of entity system networks or part of financial institution networks. The terminal may be any device able to store and provide physical resources. This may be an ATM, point-of-transaction device, kiosk, or the like. The resource processing terminal may be able to accept and/or transmit physical resources and provide transmission of the same via communication channels. Activity data, as used herein may refer to the activity occurring at the resource processing terminal, including physical resource transfers, physical resource requests, or the like and the associated data transmission along a real time transfer RFP messaging platform. A "resource instrument device" may be a device associated with a user used for initiation of a resource distribution or activity at a resource processing terminal, such as a user device, cellular device, computer device, or the like.

As used herein, "authentication credentials" may be any information that can be used to identify of a user. For example, a system may prompt a user to enter authentication information such as a username, a password, a personal identification number (PIN), a passcode, an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, ATM transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

Maintaining security of activity data from networked devices, determining authorization of the users and/or the entities involved in the activities, and managing expedited end point transmission are an important concern. However, determining validity of activities and processing end party recipient thereof is time intensive and consumes immense processing resources. Accordingly, the activity data may be transmitted across multiple party systems prior to end point processing. Moreover, conventional rapid interaction completion systems inherently not structured for real time processing to the end point. Therefore, there is a need for systems, methods and computer program products for activity data dispensing using alternative communication rails for end point transmission in real time.

Typically, the resource instrument device and the resource processing terminal comprise one or more proximity scanner device structured for detecting at least one parameter associated with the activity data that is populated from an invoice via the first proximity communication channel. In some embodiments the apparatuses and systems further comprise at least one memory device, at least one communication device connected to a distributed network and at least one processing device operatively coupled to the at least one memory device. The apparatuses and systems further comprise a module stored in the at least one memory device comprising executable instructions that when executed by the at least one processing device, cause the at least one processing device to perform the steps provided herein.

Shortly, real time payments will be launched as a service with the capabilities of this service including an RFP which will allow both businesses and consumers request a payment from someone. In some embodiments, the system uses the RFP messaging of real time resource distribution to send request for payments and activity data to end parties by enabling a mechanism at a resource processing terminal, such as an automated teller machine (ATM).

A user can scan an indicia, such as a QR code on the screen of a resource processing terminal using a resource instrument device with a mobile application. The linkage displaying the RFP allows the user to submit activity data, such as cash to complete the invoice via real time processing to an end party. In addition, entities that typically collect resources, such as distributors, will be able to use the system and RFP messaging for invoicing provided by the distributor to deposit activity data into the appropriate accounts as they move through their distribution routes so that they do not have resources on hand for extended periods of time.

In addition, a user who is requesting resources and not transmitting resources could obtain resources in cash at the resource processing terminal. The user receiving resources can scan the indicia code on the resource processing terminal display and physical resources will be dispensed using the resource processing terminal.

What is more, the present invention provides a technical solution to a technical problem. As described herein, the technical problem includes requires invoice processing through multiple parties with a lag in distribution of resources. Furthermore, tracking of the resource processing across multiple party payment process platforms is not currently possible. The technical solution presented herein allows for the use of RFP messaging and a real-time resource distribution rail as an alternative for routing. Allowing for processing across a single rail and tracking of the resource distribution across the lifetime of the processing. Furthermore, the processing to the end point entity is in real time and is not lagged by hours or days in the current landscape or transmission of physical resources. In particular, the process is an improvement over existing solutions to the invoice processing through multiple parties based on: (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1B illustrate schematic representations 100A and 100B of a physical resource dispensing using alternative communication rails system and environment, in accordance with embodiments of the present invention. FIGS. 1A-1B provide a unique system that includes specialized servers and systems, communicably linked across a distributive network of nodes required to perform the functions of preemptive transformation and structuring of resource data at a resource instrument device, and authentication of resource data for processing from the resource instrument device to an end point party in real time without requiring intermediary processing. In some embodiments the apparatuses and systems comprise a resource processing terminal device structured for operative communication with a resource instrument device such as a mobile device with a mobile application embedded thereon via a first proximity communication channel between the resource processing terminal and the resource instrument device. As illustrated in FIGS. 1A-1B, the authentication system 108 or application server is operatively coupled, via a network 101 to the user device 104, to the resource processing system 106, and one or more devices of an entity system network 180 (e.g., resource processing terminal device 180a, second networked device 180b, third networked device 180c, . . . , $N^{th}$ networked device 180n, and/or the like) and to real-time interaction systems 190. In this way, the authentication system 108 can send information to and receive information from the user device 104, the resource processing system 106 or financial institution server, the real-time interaction systems 190, or the like. FIGS. 1A-1B illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network signals and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, the network 101 may enable communication between devices thorough near-field communication, transmission of electromagnetic waves, sound waves or any other suitable means. In some embodiments, the network 101 includes the internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user mobile device 104 and the second networked device 180b). In this regard, the wireless communication channel may further comprise near field communication (NFC), communication via radio waves, communication through the internet, communication via electromagnetic waves and the like. In some embodiments, the wireless communication channel may further comprise an optical communication, e.g., in the form of image scanning and transmission.

In some embodiments, the user 102 is an individual that has a user device 104, such as a mobile phone, tablet, or the like. The user device 104 may be, for example, a desktop personal computer, a mobile system, such as a cellular phone, smart phone, personal data assistant (PDA), laptop, or the like. The user device 104 generally comprises a communication device 112, a processing device 114, and a memory device 116. The user device 104 may comprise a positioning system device 113 configured for location determination/navigation (GPS devices, accelerometers and the like). The user device 104 may comprise other devices that are not illustrated, configured for authentication (fingerprint scanners, microphones, iris scanners and the like), for image capture (cameras, AR devices and the like), for display (screens, hologram projectors and the like), and other purposes. The user device 104 is a computing system that enables the user to perform one or more authentication functions for one or more user activities. The processing device 114 is operatively coupled to the communication device 112 and the memory device 116. The processing device 114 uses the communication device 112 to communicate with the network 101 and other devices on the network 101, such as, but not limited to the resource processing system 106, the compatible devices (180a-180n) of the entity system network 180 and the authentication system 108. As such, the communication device 112 generally comprises a modem, server, or other device for communicating with other devices on the network 101. In some embodiments, the user device 104 may comprise one or more user devices comprising mobile phones, tablets, smartphones, computers and wearable devices like smart watches, glasses, jewelry, fitness and activity monitors and the like.

The user device 104 comprises computer-readable instructions 120 and data storage 118 stored in the memory device 116, which in one embodiment includes the computer-readable instructions 120 of a user application 122. In some embodiments user device 104 may refer to multiple user devices that may be configured to communicate with the authentication system 108 and/or the resource processing system 106 via the network 101. The user application 122 may be a standalone application configured for dynamic authentication assessment or the user application 122 may refer to one or more existing applications on the user device 104. In some embodiments the authentication system 108 and/or the resource processing system 106 may transmit control signals to the user device 104, configured to cause the user application 122 to perform one or more functions or steps associated with enhanced secure resource transmissions. The user 102 may communicate with the user device 104 via a proximity communication channel 10b involving, audio communication, gesture-based communication, video communication, textual communication, and/or the like.

The user 102 may further be associated with a resource instrument device 110. In accordance with some embodiments of the invention, the resource instrument device 110 may be the user device 104, the user device 104 with a dedicated application for authentication and communication with the entity system network 180 or the like. In accordance with some embodiments of the invention, a resource instrument device 110 may refer to a mobile device (e.g., the user device 104), with an authorized credential element 111 in the form of a QR code scanned therefrom or displayed thereon.

In some embodiments the resource instrument device 110 is structured for contactless communication with the first networked device 180a/resource processing terminal device 180a (e.g., a point of sale terminal, an ATM, and the like) of the entity system network 180 via a first proximity channel 10a. Communication via the first proximity channel 10a comprises communications using near field communication and/or radio frequency communication (RFID), optical communication, and/or the like.

As further illustrated in FIGS. 1A-1B, the authentication system 108 generally comprises a communication device 146, a processing device 148, and a memory device 150. As used herein, the term "processing device" generally includes circuitry used for implementing the communication and/or logic functions of the particular system. For example, a processing device 148 may include a digital signal processor device, a microprocessor device, and various analog-to-digital converters, digital-to-analog converters, and other support circuits and/or combinations of the foregoing. Control and signal processing functions of the system are allocated between these processing devices 148 according to their respective capabilities. The processing device 148 may include functionality to operate one or more software programs based on computer-readable instructions 154 thereof, which may be stored in a memory device 150.

The processing device 148 is operatively coupled to the communication device 146 and the memory device 150. The processing device 148 uses the communication device 146 to communicate with the network 101 and other devices on the network 101, such as, but not limited to the resource processing system 106, the user device 104 and the real-time interaction systems 190. As such, the communication device 146 generally comprises a modem, server, or other device for communicating with other devices on the network 101.

As further illustrated in FIGS. 1A-1B, the authentication system 108 comprises computer-readable instructions 154 stored in the memory device 150, which in one embodiment includes the computer-readable instructions 154 of an authentication application 158. In some embodiments, the memory device 150 includes data storage 152 for storing data related to the system environment, but not limited to data created and/or used by the authentication application 158. In some embodiments, the authentication application 158 provides assessment of network authentication requirements based on situational instance. In some embodiments, the authentication system 108 may retrieve user authentication information, financial information, and the like from the resource processing system 106. In this way, the authentication application 158 may communicate with the resource processing system 106, the user device 104, real-time interaction systems 190, merchant systems and other third-party systems to determine authentication requirements for a particular activity.

As illustrated in FIGS. 1A-1B, the resource processing system 106 is connected to the authentication system 108 and is associated with a financial institution network to authenticate a user 102 and present the appropriate indicia at the resource processing terminal 180a. Furthermore the processing system processes real-time resource distributions and identify RFP messaging. In this way, while only one resource processing system 106 is illustrated in FIGS. 1A-1B, it is understood that multiple network systems may make up the system environment 100. The resource processing system 106 generally comprises a communication device 136, a processing device 138, and a memory device 140. The resource processing system 106 comprises computer-readable instructions 142 stored in the memory device 140, which in one embodiment includes the computer-readable instructions 142 of a resource processing application 144. The resource processing system 106 may communicate with the authentication system 108 and entity system networks 180 to provide authentication credentials for user activities. In some embodiments, the resource processing terminal device 180a may be associated with a financial institution and the resource processing system 106. The authentication system 108 may communicate with the resource processing system 106 via a secure connection generated for secure encrypted communications between the two systems for ascertaining authentication requirements. In some embodiments, the secure connection may be an operative communication link/channel established via the network 101.

As illustrated in FIGS. 1A-1B, the authentication system and environment comprises an entity system network 180 having one or more devices, such as, a first networked device 180a/resource processing terminal device 180a and other network devices, a second networked device 180b, a third networked device 180c, . . . , an $N^{th}$ networked device 180n, and/or the like. In some embodiments, the first networked device 180a/resource processing terminal device 180a is a point of sale terminal, an ATM, and/or the like, structured for contactless communication with the resource instrument device 110 via the first proximity channel 10a. Communication via the first proximity channel 10a comprises communications using near field communication and/or or radio frequency communication (RFID). This allows for the user 102 to convert their user device 104 into a resource instrument device 110 with the appropriate application and scanning of an indicia on the first network device 180a for performing resource transfers (e.g., payments) for a invoices such as user activity (e.g., purchase). The second networked device 180b may refer to an entity device or group of devices (e.g., a beacon, a transmitter device, a beacon transmitter, a sensor device, a processing device, and/or the like, and/or a combination of the foregoing) having an entity intelligent platform application stored thereon.

In some embodiments, each of the one or more devices of the entity system network 180 (e.g., first networked device 180a/resource processing terminal device 180a, second networked device 180b, third networked device 180c, . . . , Nth networked device 180n, and/or the like) may comprise a communication device 166, a processing device 168, and a memory device 170, as detailed with respect to FIG. 2. The memory device 170 may further comprise computer readable instructions 172, and an entity application 174. For the second networked device 180b, the entity application 174 may refer to the entity intelligent platform application.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates a schematic representation 200 of a resource processing terminal device 180a, in accordance with embodiments of the present invention. The resource processing terminal device 180a may also be referred to as a first networked device 180a, and may be a point of sale terminal, an ATM, an entity device, another network device, and/or any combination of the aforementioned devices.

The resource processing terminal device 180a may generally include a processing device or processor 168a communicably coupled to devices such as, a memory device 170a, output devices 230 (for example, a display device 232, or a speaker 234), input devices 240 (such as a microphone, keypad, touchpad, touch screen, and the like), a communication device or network interface device 166a, a power source 215, a clock or other timer 280, a visual capture device such as a camera 250, a positioning system device 260, such as a geo-positioning system device like a GPS device, an accelerometer, and the like, one or more chips, and the like. The processor 168a may further include a central processing unit 202, input/output (I/O) port controllers 204, a graphics controller 205, a serial bus controller 206 and a memory and local bus controller 208.

The processor 168a may include functionality to operate one or more software programs or applications, which may be stored in the memory device 170a. For example, the processor 168a may be capable of operating applications such as the entity application 174a. The entity application 174a may then allow the resource processing terminal device 180a to transmit and receive data and instructions from second networked device 180b (e.g., via the channel 10c), the authentication system 108, user device 104 and/or the resource processing system 106, web content, such as, for example, location-based content and/or other web page content, according to a Wireless Application Protocol (WAP), Hypertext Transfer Protocol (HTTP), and/or the like.

The entity application 174a may include the necessary circuitry to provide token storage and transmission functionality, transmitter device signal encoding and decoding functionality to the resource processing terminal device 180a, for secure transmission of financial and authentication credential tokens via the contactless communication interface 279. That said, in some embodiments the entity 174a is pre-installed on the resource processing terminal device 180a, while in other embodiments, the authentication system 108 and/or the resource processing system 106 may transmit and cause installation of the entity application 174a based on determining that the resource processing terminal device 180a does not comprise the application 174a.

The processor 168a may be configured to use the network interface device 166a to communicate with one or more other devices on a network 101 such as, but not limited to the user device 104, the resource instrument device 110, the second networked device 180b, the authentication system 108 and/or the resource processing system 106. In this regard, the network interface device 166a may include an antenna 276 operatively coupled to a transmitter 274 and a receiver 272 (together a "transceiver"), modem 278 and a contactless communication interface 279. The processor 168a may be configured to provide signals to and receive signals from the transmitter 274 and receiver 272, respectively. The signals may include signaling information in accordance with the air interface standard of the applicable BLE standard, cellular system of the wireless telephone network and the like, that may be part of the network 101. In this regard, the resource processing terminal device 180a may be configured to operate with one or more air interface standards, communication protocols, modulation types, and access types. By way of illustration, the resource processing terminal device 180a may be configured to operate in accordance with any of a number of first, second, third, and/or fourth-generation communication protocols and/or the like. For example, the resource processing terminal device 180a may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The resource processing terminal device 180a may also be configured to operate in accordance with non-cellular communication mechanisms, such as via a wireless local area network (WLAN) or other communication/data networks. The resource processing terminal device 180a may also be configured to operate in a low energy, audio frequency, ultrasound frequency, or other communication/data networks.

The network interface device 166a or communication device 166a may also include an entity interface presented in output devices 230 in order to allow an individual associated with the entity to execute some or all of processes described herein. The application interface may have access to the hardware, for example, the transceiver, and software previously described with respect to the network interface device 166a. Furthermore, the application interface may have the ability to connect to and communicate with an external data storage on a separate system within the network 101. As described above, the resource processing terminal device 180a includes a display device 232 having a display interface that includes output devices 230 and/or input devices 240. The output devices 230 may include a display 232 (e.g., a liquid crystal display (LCD) or the like) and a speaker 234 or other audio device, which are operatively coupled to the processor 168a. The input devices 240, which may allow the resource processing terminal device 180a to receive data from the user 102 or an individual associated with the entity, may include any of a number of devices allowing the resource processing terminal device 180a to receive data, such as a keypad, keyboard, touchscreen, touchpad, microphone, mouse, joystick, other pointer device, button, soft key, and/or other input device(s).

The resource processing terminal device 180a may further include a power source 215 (e.g., a rechargeable DC power source). Generally, the power source 215 is a device that supplies electrical energy to an electrical load. In some embodiment, power source 215 may convert a form of energy such as solar energy, chemical energy, mechanical energy, and the like, to electrical energy. Generally, the power source 215 in a resource processing terminal device 180a may be a battery, such as a lithium battery, a nickel-metal hydride battery, or the like, that is used for powering various circuits, for example, the transceiver circuit, and other devices that are used to operate the resource processing terminal device 180a. Alternatively, the power source 215 may be a power adapter that can connect a power supply from a power outlet to the resource processing terminal device 180a. In such embodiments, a power adapter may be classified as a power source 215 within the resource processing terminal device 180a.

As discussed previously, the resource processing terminal device 180a comprises computer-readable instructions 172a and data storage 218 stored in the memory device 170a, which in one embodiment includes the computer-readable instructions 172a of the entity application 174a. The resource processing terminal device 180a may also include a memory buffer, cache memory or temporary memory device operatively coupled to the processor 168a. Typically, one or more applications such as the entity application 174a, are loaded into the temporarily memory during use. As used herein, memory may include any computer readable medium configured to store data, code, or other information. The memory device 170a may include volatile memory, such as volatile Random-Access Memory (RAM) including a cache area for the temporary storage of data. The memory device 170a may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the authentication system 108 and/or the resource processing system 106 performing one or more steps described herein in conjunction with other devices and systems, either automatically based on executing computer readable instructions 154 of the memory device 150 and/or the memory device 140, or in response to receiving control instructions from the authentication system 108 and/or the resource processing system 106. In some instances, the system refers to the authentication system 108 and/or the resource processing system 106. In some instances, the system refers to the devices and systems on the network environment 100 of FIGS. 1A-1B. In some instances, the system refers to the resource processing terminal device 180a. The features and functions of various embodiments of the invention are be described below in further detail.

Referring now to FIG. 3, illustrating a high-level process flow 300 for physical resource dispensing using alternative communication rails. As illustrated in block 302, the process 300 is initiated by receiving a resource distribution request invoice for a user to receive or distribute resources via a resource instrument device. In some embodiments, an entity may have an invoice for payment by a user, the invoice may have multiple parties associated with the invoice, such as a distributor. The distributor may provide a product to a merchant that then may sell a product to the user. Using this system, the user is able to pay the manufacturer or distributor directly without passing or distributing resources across multiple parties. Furthermore, in some embodiments, an entity may be able to provide physical resources directly to a user for a specific distribution, such as for insurance purposes or the like. The invoice may be a payment or a distribution for a specific product or service.

As illustrated in block 304, the process 300 continues by triggering the alternative communication rail processing using a resource processing terminal and resource instrument device linkage based on an RFP message associated with a resource distribution request. In this way, the entity associated with the invoice may request use of the system for completion of the invoice transaction. In this way the entity may perform a direct transaction between the user and the entity without requiring multi party processing of the resources associated with the invoice. The triggering of the alternative communication rail processing uses ISO2022 RFP messaging via a real time resource distribution request and positions the invoice information on the RFP message for completion. The RFP messaging may comprise information about the invoice, pricing, payment information, product information, and the like.

As illustrated in block 306, the process 300 continues by generating an indicia associated with the resource distribution request based on the RFP message generated for presentation on a resource processing terminal. In this way, the system generates an indicia for scanning at a resource processing terminal associated with the invoice and the RFP. The indicia may be tied directly to the user and once created the system may present a notification to the user of the invoice.

As illustrated in block 308, the process 300 continues by authenticating the user into the resource processing terminal and present the indicia to the user via the display on the resource processing terminal display. The user may be authenticated into the resource processing terminal based on ATM or other resource processing terminal authentication means, such as a password, PIN, card and PIN, or the like.

Once authenticated at the resource processing terminal, the system may present the indicia on the display of the resource processing terminal display. Based on the user authentication into the resource processing terminal, the system identifies the user and initiates presentation of the indicia for user scanning.

As illustrated in block 310, the process 300 continues by creating a communication linkage based on the scanning of the indicia by the resource instrument device of the user at the resource processing terminal. In this way, the user device with an application associated with and authorized into a mobile application associated with a financial institution is able to scan the indicia, such as a QR code on the resource processing terminal display to create the communication linkage. The resource instrument device associated with the user is the user's device with the authenticated application embedded thereon.

The communication linkage then allows for the user to view the invoice and allows the user to pay the invoice or receive distributions associated with the invoice in physical resources via the resource processing terminal. This can be a cash payment or distribution. This could also be a check payment or distribution. As illustrated in block 312, the process 300 is finalized by allowing distribution of the physical resources to the invoice entity or to the user directly based on the communication linkages and RFP invoice message instructions.

In some embodiments, the invention may be used by a distributor to distribute products to merchant locations. The distributor may be paid via the physical resource dispensing using alternative communication rails process. As such, this allows the distributor to work with the financial institution to create the RFP message for a mobile application. The distributor may receive resources, scan resource processing terminal display and select a merchant on the screen and deposit the funds directly to the account associated with the merchant invoice. The merchant is credited immediately for the deposit and no additional processing through third parties is necessary.

In some embodiments, the invention may be used when a dependent receives resources from a guardian. The guardian may be able to invoice through a school or merchant for a product. The dependent may scan the indicia at the resource processing terminal and get physical resources to pay the invoice. The system may tie the resource extraction directly to the RFP message and the guardian may be allowed to approve the RFP and the transfer of physical resources to the invoicing entity.

In some embodiments, a statement from a merchant may be due for a user. The merchant may provide an online invoice via RFP. The user may be able to scan the indicia at the resource processing terminal and deposit the physical resources using the system. In this way, the RFP may have a trail of invoice and payment.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will be further understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for resource dispensing using alternative communication rails, the system comprising:
   a memory device with computer-readable program code stored thereon;
   a communication device, wherein the communication device is configured to establish operative communication with a plurality of networked devices via a communication network;
   a processing device operatively coupled to the memory device and the communication device, wherein the processing device is configured to execute the computer-readable program code to:
   receive a resource distribution request input and transform the resource distribution request input into a request for payment (RFP) message on an alternative communication rail from an end point entity to a user;

trigger the alternative communication rail processing based on input into the RFP message from an end point entity;

create a readable indicia for presentation at a resource processing terminal associated device with an entity system network;

present the readable indicia at a resource processing terminal device;

generate a resource instrument device based on user scanning of a QR code at the resource processing terminal device using a user device with a mobile application embedded thereon that is displaying the readable indicia;

create an operative communication linkage between the resource instrument device and the resource processing terminal device via a first proximity communication channel using the RFP message associated with alternative rail resource distribution processing, wherein the operative communication linkage allows the resource instrument device access to and display of the RFP using the alternative communication rail of the resource processing terminal device via the mobile application; and allow direct resource distribution between the end point entity and the user via the resource processing terminal device using the alternative communication rail, wherein the direct distribution of resources comprises physical currency or physical check transfers.

2. The system of claim 1, wherein the resource distribution request input into the RFP message further comprises an invoice from an end point entity that includes a request for distribution to the end point entity or a request for distribution to the user of physical resources.

3. The system of claim 1, further comprising eliminating multiparty processing of the resource distribution using the RFP message on the alternative communication rail, wherein the alternative communication rail is a real-time payment rail.

4. The system of claim 1, wherein the user has an account on a mobile application associated with the entity system network, wherein the entity system network is a financial institution network.

5. The system of claim 1, further comprising tracking resource processing by communicating with a location of the RFP message across a single rail.

6. A computer program product for physical resource dispensing using alternative communication rails, the computer program product comprising at least one non-transitory computer-readable medium having computer-readable program code portions embodied therein, the computer-readable program code portions comprising:

receiving a resource distribution request input and transforming the resource distribution request input into request for payment (RFP) message on alternative communication rail from an end point entity to a user;

triggering the alternative communication rail processing based on input into the RFP message from an end point entity;

creating a readable indicia for presentation at a resource processing terminal device associated with an entity system network;

presenting the readable indicia at a resource processing terminal device;

generating a resource instrument device based on user scanning of a QR code at the resource processing terminal device using a user device with a mobile application embedded thereon that is displaying the readable indicia;

creating an operative communication linkage between the resource instrument device and the resource processing terminal device via a first proximity communication channel using the RFP message associated with alternative rail resource distribution processing, wherein the operative communication linkage allows the resource instrument device access to and display of the RFP using the alternative communication rail of the resource processing terminal device via the mobile application; and allowing direct resource distribution between the end point entity and the user via the resource processing terminal device using the alternative communication rail, wherein the direct distribution of resources comprises physical currency or physical check transfers.

7. The computer program product of claim 6, wherein the resource distribution request input into the RFP message further comprises an invoice from an end point entity that includes a request for distribution to the end point entity or a request for distribution to the user of physical resources.

8. The computer program product of claim 6, further comprising an eliminating multiparty processing of the resource distribution using the RFP message on the alternative communication rail, wherein the alternative communication rail is a real-time payment rail.

9. The computer program product of claim 6, wherein the user has an account on a mobile application associated with the entity system network, wherein the entity system network is a financial institution network.

10. The computer program product of claim 6, further comprising an tracking resource processing by communicating with a location of the RFP message across a single rail.

11. Computer-implemented method for physical resource dispensing using alternative communication rails, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

receiving a resource distribution request input and transforming the resource distribution request input into a request for payment (RFP) message on an alternative communication rail from an end point entity to a user;

triggering the alternative communication rail processing based on input into the RFP message from an end point entity;

creating a readable indicia for presentation at a resource processing terminal device associated with an entity system network;

presenting the readable indicia at a resource processing terminal device;

generating a resource instrument device based on user scanning of a QR code at the resource processing terminal device using a user device with a mobile application embedded thereon that is displaying the readable indicia;

creating an operative communication linkage between the resource instrument device and the resource processing terminal device via a first proximity communication channel using the RFP message associated with alternative rail resource distribution processing, wherein the operative communication linkage allows the resource instrument device access to and display of the RFP using the alternative communication rail of the resource processing terminal device via the mobile application; and allowing direct resource distribution between the end point entity and the user via the resource processing terminal device using the alternative communication rail, wherein the direct distribution of resources comprises physical currency or physical check transfers.

12. The computer-implemented method of claim 11, wherein the resource distribution request input into the RFP message further comprises an invoice from an end point entity that includes a request for distribution to the end point entity or a request for distribution to the user of physical resources.

13. The computer-implemented method of claim 11, further comprising eliminating multiparty processing of the resource distribution using the RFP message on the alternative communication rail, wherein the alternative communication rail is a real-time payment rail.

14. The computer-implemented method of claim 11, wherein the user has an account on a mobile application associated with the entity system network, wherein the entity system network is a financial institution network.

15. The system of claim 1, wherein the distribution of checks as payment for the RFP transaction further comprises having funds and authenticity validated by a threat management system of an entity system network.

16. The system of claim 1, wherein resource processing terminals associated with a financial institution network are configured to process RFP transactions for users with financial accounts with a different financial institution network.

17. The system of claim 1, wherein the users having an account with a financial institution network is optional for the users engaging in resource transfers that are exclusively physical currency.

18. The computer program product of claim 6, wherein the distribution of checks as payment for the RFP transaction further comprises having funds and authenticity validated by a threat management system of an entity system network.

19. The computer program product of claim 6, wherein resource processing terminals associated with a financial institution network are configured to process RFP transactions for users with financial accounts with a different financial institution network.

20. The computer program product of claim 6, wherein the users having an account with a financial institution network is optional for the users engaging in resource transfers that are exclusively physical currency.

* * * * *